United States Patent
Choi

(10) Patent No.: US 7,429,184 B2
(45) Date of Patent: Sep. 30, 2008

(54) LAMP HOLDER, LAMP ASSEMBLY HAVING THE SAME, BACKLIGHT ASSEMBLY HAVING THE SAME, AND DISPLAY DEVICE HAVING THE SAME

(75) Inventor: Seong-Sik Choi, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 185 days.

(21) Appl. No.: 11/184,275

(22) Filed: Jul. 18, 2005

(65) Prior Publication Data

US 2006/0109663 A1    May 25, 2006

(30) Foreign Application Priority Data

Nov. 25, 2004    (KR) .................. 10-2004-0097635

(51) Int. Cl.
*H01R 33/02* (2006.01)
(52) U.S. Cl. .................. 439/242; 439/226; 439/596
(58) Field of Classification Search ................ 439/619, 439/596, 419, 699.2, 687, 696, 226–242
See application file for complete search history.

(56) References Cited

U.S. PATENT DOCUMENTS

| | | | | |
|---|---|---|---|---|
| 2,814,787 A * | 11/1957 | Jessup | | 439/235 |
| 3,299,264 A * | 1/1967 | Lipscomb | | 439/226 |
| 3,344,390 A * | 9/1967 | Dell | | 439/242 |
| 3,898,495 A * | 8/1975 | Livera | | 313/51 |
| 4,065,198 A * | 12/1977 | Jordan | | 439/56 |
| 4,101,187 A * | 7/1978 | Collier | | 439/596 |
| 4,837,479 A * | 6/1989 | Devir et al. | | 313/318.07 |
| 5,372,525 A * | 12/1994 | Wu et al. | | 439/656 |
| 5,511,989 A * | 4/1996 | Cheng et al. | | 439/419 |
| 6,878,015 B2 * | 4/2005 | Fan | | 439/699.2 |
| 7,025,634 B1 * | 4/2006 | Swantner et al. | | 439/619 |
| 2002/0086573 A1* | 7/2002 | You | | 439/226 |
| 2006/0264105 A1* | 11/2006 | Lin | | 439/619 |

FOREIGN PATENT DOCUMENTS

CN    1379274    11/2002

* cited by examiner

*Primary Examiner*—Gary F. Paumen
(74) *Attorney, Agent, or Firm*—MacPherson Kwok Chen & Heid LLP

(57) ABSTRACT

A lamp holder includes a first holder, a second holder and a connecting part. The second holder is coupled with the first holder to cover an end portion of the lamp. The connecting part connects the first and second holders with each other. Thus, the lamp holder is assembled easily by the connecting part to protect the lamp, so that the lamp is safely supplied with power.

13 Claims, 5 Drawing Sheets

LAMP HOLDER, LAMP ASSEMBLY HAVING THE SAME, BACKLIGHT ASSEMBLY HAVING THE SAME, AND DISPLAY DEVICE HAVING THE SAME

CROSS-REFERENCE TO RELATED APPLICATIONS

This application relies for priority upon Korean Patent Application No. 2004-97635 filed on Nov. 25, 2004, the content of which is herein incorporated by reference in its entirety.

BACKGROUND OF THE INVENTION

1. Field of the Invention

The present invention relates to a lamp holder, a lamp assembly having the lamp holder, a backlight assembly having the lamp holder, and a display device having the lamp holder. More particularly, the present invention relates to a lamp holder capable of supplying power to the lamp safely, a lamp assembly having the lamp holder, a backlight assembly having the lamp holder, and a display device having the lamp holder.

2. Description of the Related Art

Display devices are used in various electronic devices such as cellular phones, digital cameras, notebook computers, monitors, etc. There are several different types of display devices, one of which is a flat type display device.

A liquid crystal display (LCD) device is a flat type display device that displays an image using electrical characteristics and optical characteristics of liquid crystals. The LCD device has advantageous characteristics such as thinness, light weight, low power consumption and low driving voltage, among others. Therefore, the LCD device is widely used in various fields.

A conventional LCD device includes a display panel displaying an image using the light transmissivity of liquid crystals and a backlight assembly providing the display panel with light.

The backlight assembly includes a lamp and a power transmitting wire supplying power to the lamp to generate light. In general, the power transmitting wire is electrically soldered to an electrode of the lamp to supply the power from an external source to the lamp.

The soldered electrical connection to the lamp electrode, however, has the problem of becoming easily disconnected from the soldered position by an external force. An undesirable result of this problem is that the electrode of the lamp is easily deteriorated by an external impact. A method of more securely connecting the power transmitting wire to the lamp electrode is desired.

SUMMARY OF THE INVENTION

Therefore, regarding above-mentioned disadvantages of the related arts, the present invention provides a lamp holder with a secure power supply connection.

The present invention also provides a lamp assembly including the above-mentioned lamp holder.

The present invention also provides a backlight assembly including the above-mentioned lamp holder.

The present invention also provides a display device including the above-mentioned lamp holder.

A lamp holder according to an aspect of the present invention includes a first holder, a second holder and a connecting part. The second holder is coupled with the first holder to cover an end portion of the lamp. The connecting part connects the first and second holders to each other. The connecting part may include a flexible material so that the first and second holders can be combined with each other by an external force.

A lamp assembly according to another aspect of the present invention includes a lamp, a power transmitting wire and a lamp holder. The lamp includes a lamp body and an electrode disposed on an end portion of the lamp body. The power transmitting wire is electrically connected to the electrode to transmit a power to the electrode. The lamp holder includes a first holder, a second holder coupled with the first holder to cover the end portion of the lamp and at least a part of the power transmitting wire, and a connecting part connecting the first and second holders with each other.

A backlight assembly according to still another aspect of the present invention includes a lamp and a receiving container. The lamp assembly includes a lamp having an electrode, a power transmitting wire electrically connected to the electrode to transmit a power to the electrode, and a lamp holder including a first and second holders and a connecting part connecting the first and second holders with each other to cover an end portion of the lamp and at least a part of the power transmitting wire. The receiving container includes a bottom plate and a sidewall to receive the lamp assembly.

A display device according to still another aspect of the present invention includes a backlight assembly and a display panel. The backlight assembly includes a lamp having an electrode, a power transmitting wire electrically connected to the electrode to transmit a power to the electrode, and a lamp holder including a first and second holders and a connecting part connecting the first and second holders with each other to cover an end portion of the lamp and at least a part of the power transmitting wire. The display panel is disposed over the backlight assembly to display an image using a light emitted from the lamp.

The present invention allows easy assembling and disassembling of the lamp holder that protects the lamp. The lamp holder protects the lamp from outside impact and prevents disconnection of the power transmitting wire, allowing power to be supplied to the lamp securely. Overall, the invention improves the display quality of an image.

BRIEF DESCRIPTION OF THE DRAWINGS

The above and other features and advantage points of the present invention will become more apparent by describing in detailed exemplary embodiments thereof with reference to the accompanying drawings, in which.

DESCRIPTION OF THE EMBODIMENTS

Figure 1:
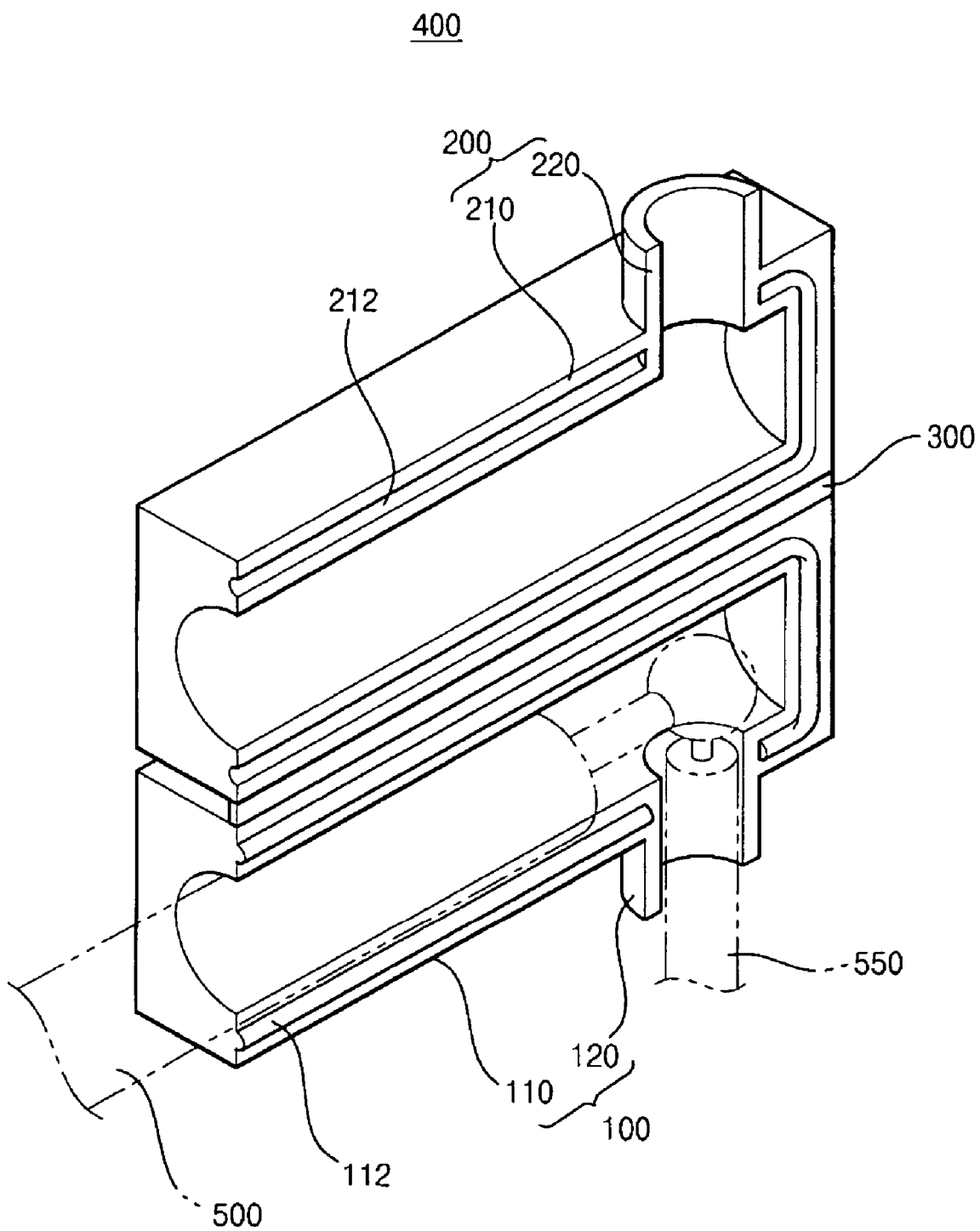
FIG. 1 is an exploded perspective view illustrating a lamp holder in accordance with an exemplary embodiment of the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like reference numerals refer to similar or identical elements throughout.

FIG. 1 is an exploded perspective view illustrating a lamp holder in accordance with an exemplary embodiment of the present invention.

Referring to FIG. 1, a lamp holder 400 includes a first holder 100, a second holder 200 and a connecting part 300. The lamp holder 400, which includes the first and second holders 100 and 200 coupled with each other, protects a lamp 500.

The first holder 100 includes a first main holder part 110 and a first sub holder part 120, and the second holder 200 includes a second main holder part 210 and a second sub holder part 220. The first main holder part 110 and the first sub holder part 120 are connected with each other to form an L-shape, and the second main holder part 210 and the second sub holder part 220 are connected with each other to form another L-shape. Each of the first and second holders 100 and 200 having an L-shape, the first and second holders 100 and 200 are substantially symmetric with respect to an axis extending along the connecting part 300.

Although FIG. 1 depicts the lamp holder 400 in an "open" state the first and second main holder parts 110 and 210 can be combined with each other to form a cylindrical cavity for holding and protecting an end portion of the lamp 500. The end portion of the lamp 500 has a circular cylindrical shape. The first and second sub holder parts 120 and 220 combine with each other to form a cavity for holding the power transmitting wire 550, thus preventing the power transmitting wire 550 from drifting.

The first and second holders 100 and 200 include a joining protrusion 112 and a joining groove 212, respectively. The joining protrusion 112 and the joining groove 212 are used to combine the first holder 100 and the second holder 200 such that it forms a cylindrical cavity for the lamp-end. In one embodiment, the joining protrusion 112 is formed on the first main holder part 110 of the first holder 100, and the joining groove 212 is formed on the second main holder part 210 of the second holder 200. The joining protrusion 112 and the joining groove 212 are designed to fit with each other when the first and second holders 100, 200 are combined.

The first and second holders 100 and 200 may include a synthetic resin. The first and second holders 100 and 200 may, for example, include a material having high strength, good electrically insulating property, and good thermal resistance such as polycarbonate.

The connecting part 300 connects the first and second holders 100 and 200 that are symmetrically arranged with respect to the connecting part 300. A first end portion of the connecting part 300 is connected to a first edge of the first main holder part 110. The first edge of the first main holder part 110 is the opposite edge from a second edge of the first main holder part 110 where the first sub holder part 120 is disposed. A second end portion of the connecting part 300 is connected to a first edge of the second main holder part 210. The first edge of the second main holder part 210 combines with the first edge of the first main holder part 110 when the lamp holder 400 is assembled.

The first holder 100 and second holder 200, for example, are rotated with respect to the connecting part 300 to be combined with each other. In the present embodiment, the connecting part 300 is flexible so that it can fold to allow the first and second holders 100 and 200 to be assembled. The connecting part 300 may be thin. The connecting part 300 may, for example, include a ductile synthetic resin.

The first and second holders 100 and 200 may be easily rotated with respect to the flexible and ductile connecting part 300 to be combined with each other, so that the lamp holder 400 may be assembled easily.

Figure 2:
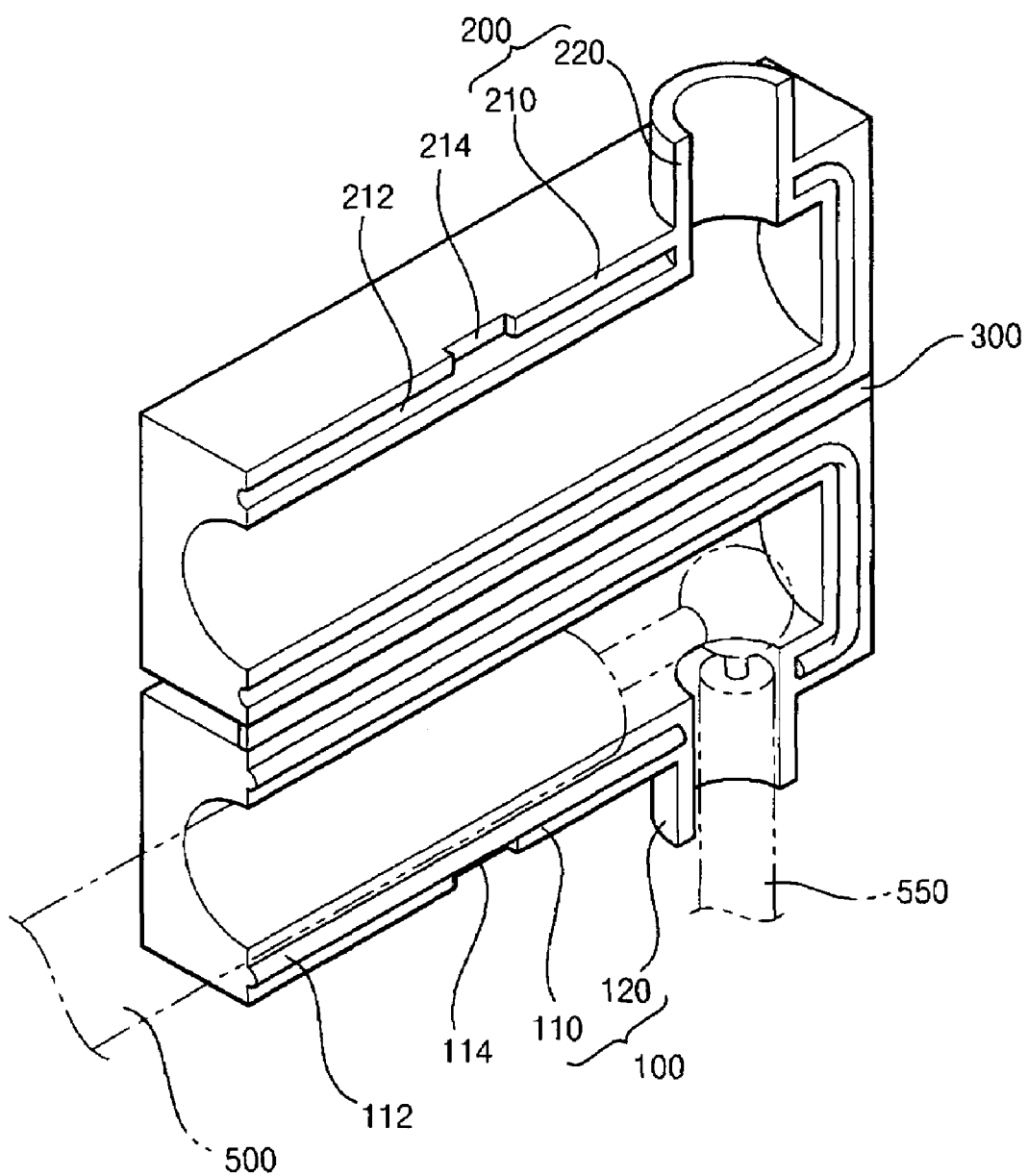
FIG. 2 is an exploded perspective view illustrating a lamp holder in accordance with another exemplary embodiment of the present invention.

FIG. 2 is an exploded perspective view illustrating a lamp holder in accordance with another exemplary embodiment of the present invention. The lamp holder in accordance with the present embodiment is substantially identical to the lamp holder in FIG. 1 except for a first groove 114 and a second groove 214 formed at the first and second holders, respectively. Thus, any further description of the substantially same elements will be omitted.

Referring to FIG. 2, the lamp holder 401 includes a first holder 100, a second holder 200 and a connecting part 300.

The first holder 100 includes a first main holder part 110 and a first sub holder part 120, and the second holder 200 includes a second main holder part 210 and a second sub holder part 220. The first main holder part 110 and the first sub holder part 120 are connected with each other to form an L-shape, and the second main holder part 210 and the second sub holder part 220 are connected with each other to form another L-shape. Each of the first and second holders 100 and 200 having an L-shape, the first and second holders 100 and 200 are substantially symmetric with respect to an axis extending along the connecting part 300.

In the present embodiment, the first and second main holder parts 110 and 210 are combined with each other to form a cylindrical cavity for holding and protecting an end portion of the lamp 500 from outside impact. The shape of the cylindrical cavity is chosen to accommodate the shape of the lamp end. The first and second sub holder parts 120 and 220 are combined with each other to form a cavity for holding the power transmitting wire 550, thus holding the power transmitting wire 550 in place.

The first and second holders 100 and 200 include a joining protrusion 112 and a joining groove 212, respectively, to combine the first holder 100 and the second holder 200.

The lamp holder 401 includes a groove formed on at least one of the first and second holders 100 and 200. The groove allows the first and second holders 100 and 200 to be easily disassembled. For example, a first groove 114 and a second groove 214 are formed on the first and second holders 100 and 200, respectively, so as to disassemble the first and second holders 100 and 200. When disassembled, the first and second holders 100 and 200 are coupled only with the connecting part 300. The first and second grooves 114 and 214 are deisgned to fit with each other. The lamp holder 401 may be easily disassembled from each other, for example, by inserting a screw driver into the first and second grooves 114 and 214.

The first and second holders 100 and 200 assembled may be easily disassembled using the first and second grooves 114 and 214, so that reworkability of the lamp holder 401 may be improved.

Figure 3:
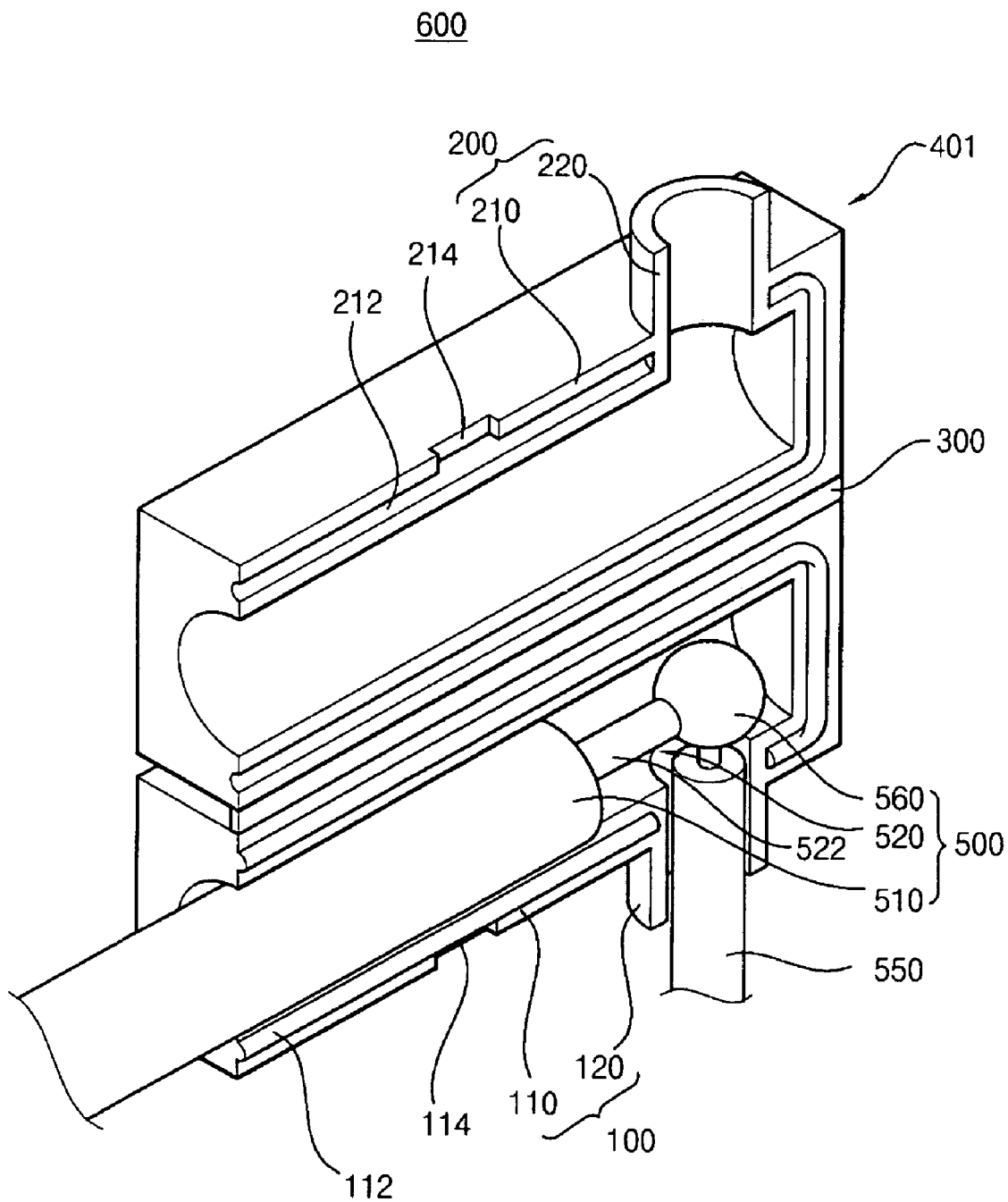
FIG. 3 is an exploded perspective view illustrating a lamp assembly in accordance with an exemplary embodiment of the present invention.

FIG. 3 is an exploded perspective view illustrating a lamp assembly in accordance with an exemplary embodiment of the present invention.

Referring to FIG. 3, a lamp assembly 600 includes a lamp 500, a power transmitting wire 550 and a lamp holder 401.

The lamp 500 includes a lamp body 510 and an electrode part 520 receiving the power applied thereto. When the power is applied to the electrode part 520 of the lamp body 510, light is generated from the lamp body 510.

The lamp body 510 including a discharge space formed therein, for example, has a cylindrical shape. The lamp body 510 may include a transparent material having high optical transmissivity, such as glass. The discharge gas is injected into an inner space of the lamp body 510. Examples of the discharge gas include mercury (Hg), argon (Ar), neon (Ne), xenon (Xe), krypton (Kr), etc.

Mercury (Hg) in the discharge gas generates ultra-violet (UV) radiation when mercury is electrically discharged in the lamp body 510. Argon (Ar), neon (Ne), xenon (Xe) and krypton (Kr) in the discharge gas are ionized to generate a secondary electron, thereby increasing the amount of the UV radiation, when the lamp 500 is operated. Therefore, a discharge firing voltage is lowered by a penning effect and the power consumption decreases.

The lamp 500 may include a fluorescent layer (not shown) formed on an inner surface of the lamp body 510. The fluorescent layer converts the invisible radiation emitted from mercury (Hg) into visible light.

The electrode part 520, for example, includes an electrode body (not shown) and the lead wire 522 transmitting power therethrough.

The electrode part 520 may include the electrode bodies (not shown), for example, disposed on inner surfaces of both end portions of the lamp body 510. Alternatively, the electrode bodies may be disposed on outer surfaces of the end portions of the lamp body 510.

The lead wire 522 electrically connected to the electrode body transmits the power to the electrode body. The lead wire 522, for example, has a rod shape.

The lamp 500 may further include a sealing member (not shown) including, for example, glass. The sealing member seals a hole through which the discharge gas is injected. The sealing member includes a throughhole and the lead wire 522 penetrates through the throughhole.

The power transmitting wire 550 is electrically connected to the lead wire 522 to transmit the power to the electrode part 520. The power transmitting wire 550, for example, is electrically connected to the lead wire 522 via a soldering part 560.

The lamp holder 401 includes a first holder 100, a second holder 200 and a connecting part 300. The lamp holder 401, which includes a combination of the first and second holders 100 and 200, protects the lamp 500 and the power transmitting wire 550 from any outside impact.

The first holder 100 includes a first main holder part 110 and a first sub holder part 120, and the second holder 200 includes a second main holder part 210 and a second sub holder part 220.

In the present embodiment, the first and second main holder parts 110 and 210 are combined with each other to form a cavity that holds and protects an end portion of the lamp 500 from any outside impact. The shape of the cavity may be chosen to accommodate the lamp 500. The first and second sub holder parts 120 and 220 are combined with each other to form a cavity for holding the power transmitting wire 550, thus holding the power transmitting wire 550 in place.

The first and second holders 100 and 200 include a joining protrusion 112 and a joining groove 212, respectively, to combine the first holder 100 to the second holder 200.

The first and second holders 100 and 200 may include a synthetic resin. The first and second holders 100 and 200, for example, include a material having high strength, good electrically insulating property, and good thermal resistance such as polycarbonate.

A first groove 114 and a second groove 214 are formed on the first and second holders 100 and 200, respectively, so as to facilitate the disassembling of the first and second holders 100 and 200. The first and second grooves 114 and 214 are designed to fit with each other.

The connecting part 300 connects the first and second holders 100 and 200 with each other. In the present embodiment, the connecting part 300 is formed adjacent to an edge of the first main holder part 110 and an edge of the second main holder part 210 to connect the first holder 100 and the second holder 200 with each other. The side of the first main holder part 110 corresponds to the side of the second main holder part 210.

The first holder 100 and second holder 200, for example, are rotated with respect to the connecting part 300 to be combined with each other and assembled. The connecting part 300 includes a flexible material so that the first and second holders 100 and 200 correspond to each other by an external force. The connecting part 300 may have a thin thickness. The connecting part 300, for example, includes a ductile synthetic resin.

The first and second holders 100 and 200 may be easily rotated with respect to the flexible and ductile connecting part 300 to be coupled with each other, so that the lamp holder 401 may be assembled easily.

In addition, the lamp holder 401 receives the end portion of the lamp 500 and a part of the power transmitting wire 550, thereby preventing the lamp 500 and the power transmitting wire 550 from being damaged, so that light may be emitted safely from the lamp 500.

Figure 4:
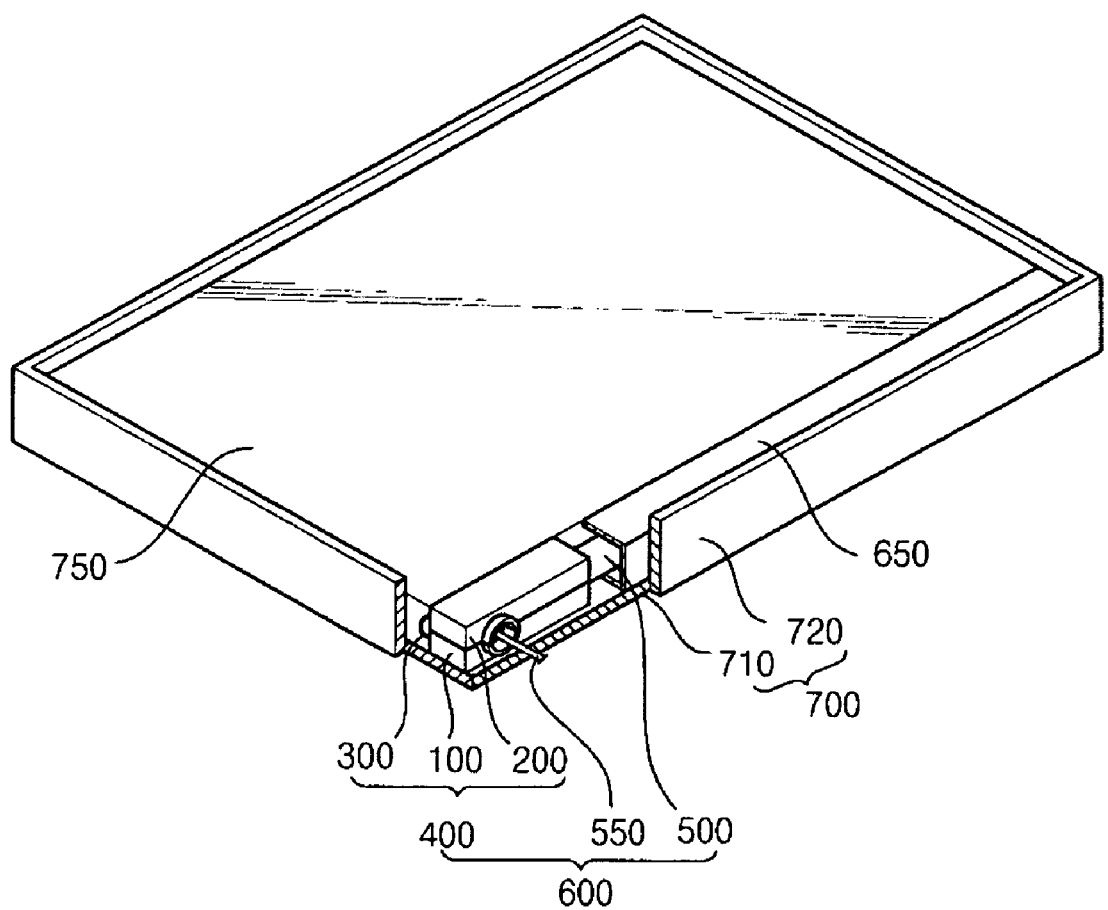
FIG. 4 is a perspective view illustrating a backlight assembly in accordance with an exemplary embodiment of the present invention.

FIG. 4 is a perspective view illustrating a backlight assembly 800 in accordance with an exemplary embodiment of the present invention. The lamp assembly of the backlight assembly 800 is substantially similar to the lamp assembly in FIG. 3 except for a lamp cover. Thus, any further description for the substantially same elements will be omitted.

Referring to FIG. 4, the backlight assembly 800 includes a lamp assembly 600 emitting light and a receiving container 700 receiving the lamp assembly 600.

The lamp assembly 600 further includes a lamp cover 650 enclosing a part of the lamp 500 to concentrate the light emitted from the lamp 500 on one side.

The receiving container 700 includes a bottom plate 710 and sidewalls 720 protruding from the bottom plate 710. A receiving space is formed on the receiving container 700 by the bottom plate 710 and the sidewalls 720, and the lamp assembly 600 is disposed at the receiving space.

The backlight assembly 800 may include a light guiding plate 750 that guides the light emitted from the lamp 500 away from the bottom plate 710 of the receiving container 700.

Figure 5:
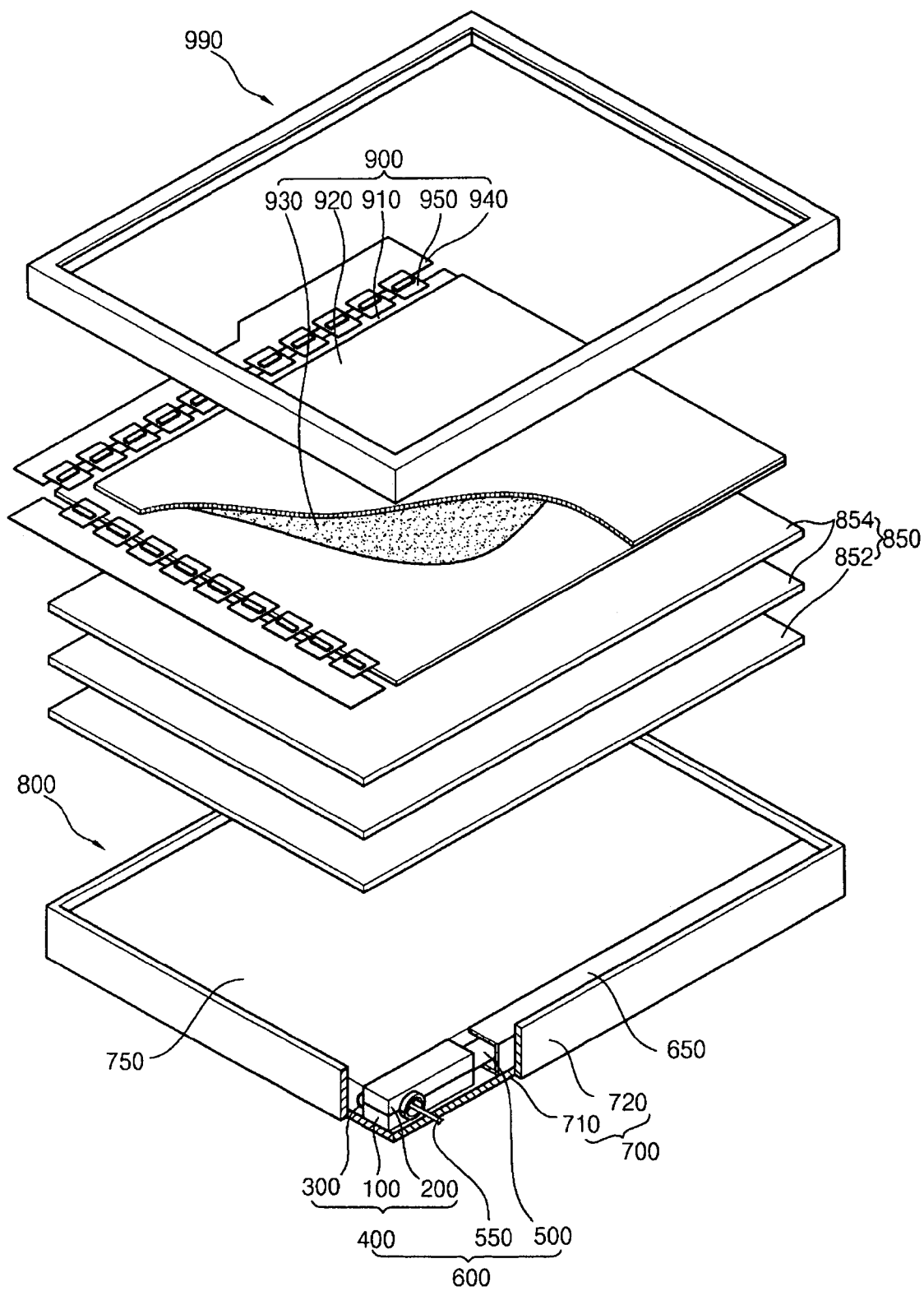
FIG. 5 is an exploded perspective view illustrating a display device in accordance with an exemplary embodiment of the present invention.

FIG. 5 is an exploded perspective view illustrating a display device in accordance with an exemplary embodiment of the present invention.

Referring to FIG. 5, a display device 1000 includes a backlight assembly 800 generating a light and a display panel 900 displaying an image.

The backlight assembly 800 of the present embodiment is substantially the same as the backlight assembly illustrated in FIG. 4. Thus, any further description of the same element will be omitted.

The display panel 900, for example, includes a first substrate 910, a second substrate 920, a liquid crystal layer 930, a printed circuit board (PCB) 940 and a flexible printed circuit FPC 950.

The first substrate 910 includes pixel electrodes arranged in a matrix shape, thin film transistors (TFTs) applying a driving voltage to the pixel electrodes and signal lines providing the TFTs with operating signals.

The pixel electrode is formed by patterning a transparent conductive film (e.g., indium tin oxide (ITO) film, indium zinc oxide (IZO) film, amorphous indium tin oxide (a-ITO) film) through a photolithographic process.

The second substrate 920 is positioned on the first substrate 910. The second substrate 920 includes a common electrode formed thereon and color filters corresponding to the pixel electrodes. The common electrode includes a transparent conductive material.

The color filters include red, green and blue color filters, which selectively transmit red, green and blue lights, respectively.

The liquid crystal layer 930 is interposed between the first and second substrates 910 and 920. The liquid crystal layer 930 is rearranged by an electric field generated between the pixel electrode and common electrode. The liquid crystal layer 930 controls an optical transmissivity of the light emitted from the backlight assembly 800, and then the light passes through the color filters. Thus, an image may be displayed using the light passed through the color filters.

The PCB 940 includes a driving circuit unit processing an image signal. The driving circuit unit converts an image signal that is provided from an external device into a driving signal controlling the TFT.

The FPC 950 electrically connects the PCB 940 to the first substrate 910 in order to provide the first substrate 910 with the driving signal from the PCB 940.

The display device 1000 may further include an optical member 850 and a chassis 990.

The optical member 850 is disposed between the backlight assembly 800 and the display panel 900 to improve optical characteristics of the light emitted from the backlight assembly 800. The optical member 850, for example, includes a diffusing sheet 852 diffusing a light and at least one prism sheet 854 improving a front-view luminance of a light using reflection and refraction thereof.

The chassis 990 surrounding an end portion of the display panel 900 is coupled with the sidewalls 720 of the receiving container 700 to fasten the display panel 900 to the backlight assembly 800.

The chassis 990 protects the display panel 900 and prevents the display panel 900 from drifting from the receiving container 700.

According to the present invention, a first holder and a second holder are easily rotated with respect to a flexible and ductile connecting part to be combined with each other, allowing easy assemblage of a lamp holder. This facilitated assemblage improves the productivity and quality of a display device employing the lamp holder.

In addition, the lamp holder forms a cavity for receiving an end portion of a lamp and a part of a power transmitting wire, thereby preventing the lamp and the power transmitting wire from being damaged. This extra protection provided by the cavity allows light to be emitted safely from the lamp, thus improving the display quality of a device employing the lamp holder.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A lamp holder holding a lamp that includes a pair of electrodes respectively disposed at end portions of the lamp, the lamp holder comprising:
    a first holder;
    a second holder coupled with the first holder to cover one of the end portions of the lamp; and
    a connecting part connecting the first and second holders with each other such that the first holder is movable with respect to the second holder while remaining coupled to the second holder;
    wherein the lamp holder has a wire-holding compartment for holding a wire that supplies power to the lamp.

2. The lamp holder of claim 1, wherein the first holder comprises a first main holder part receiving the end portion of the lamp and a first sub holder part fixing a power transmitting wire providing the lamp with power, and the second holder comprises a second main holder part receiving the end portion of the lamp and a second sub holder part fixing the power transmitting wire.

3. The lamp holder of claim 1, wherein the connecting part is foldable and wherein the first and second holders are symmetrically arranged with respect to the connecting part, such that combining the first and second holders with each other folds the connecting part.

4. The lamp holder of claim 3, wherein the connecting part includes a flexible material.

5. The lamp holder of claim 1, wherein the first holder comprises a joining protrusion, and the second holder comprises a joining groove that is designed to fit with the joining protrusion.

6. The lamp holder of claim 1, wherein a groove is formed on at least one of the first and second holders so that the groove allows the first and second holders to be easily disassembled.

7. The lamp holder of claim 1, wherein the first and second holders include a synthetic resin.

8. The lamp holder of claim 7, wherein the synthetic resin is polycarbonate.

9. A lamp assembly comprising:
    a lamp including a lamp body and a pair of electrodes respectively disposed at end portions of the lamp body;
    a power transmitting wire electrically connected to one of the electrodes to supply power to the one of the electrodes; and
    a lamp holder including a first holder, a second holder coupled with the first holder to cover one of the end portions of the lamp and at least a part of the power transmitting wire, and a connecting part connecting the first and second holders with each other such that the first holder is movable with respect to the second holder while remaining coupled to the second holder.

10. A backlight assembly comprising:
    a lamp assembly including:
    a lamp including a pair of electrodes respectively disposed at both end portions of the lamp;
    a power transmitting wire electrically connected to one of the electrodes; and
    a lamp holder including a first holder, a second holder and a connecting part connecting the first and second holders with each other to cover one of the end portions of the lamp and at least a part of the power transmitting wire, the connecting part connecting the first and second holders such that the first holder is movable with respect to the second holder while remaining coupled to the second holder; and a receiving container including a bottom plate and a sidewall to receive the lamp assembly.

11. The backlight assembly of claim 10, wherein the first and second holders include a joining protrusion and a joining groove that is designed to fit with the joining protrusion, respectively.

12. A display device comprising:

a backlight assembly including:

a lamp including a pair of electrodes respectively disposed at both end portions of the lamp;

a power transmitting wire electrically connected to one of the electrodes to transmit a power to the one of the electrodes; and a lamp holder including a first holder, a second holder and a connecting part connecting the first and second holders with each other to cover one of the end portions of the lamp and at least a part of the power transmitting wire, the connecting part connecting the first and second holders such that the first holder is movable with respect to the second holder while remaining coupled to the second holder; and a display panel disposed over the backlight assembly to display an image using light emitted from the lamp.

13. The display device of claim 12, wherein the first and second holders include a joining protrusion and a joining groove that is designed to fit with the joining protrusion, respectively.

* * * * *